United States Patent
Khalil et al.

(10) Patent No.: US 7,200,993 B2
(45) Date of Patent: Apr. 10, 2007

(54) ELECTRO-HYDRAULIC STEERING CONTROL SYSTEM

(75) Inventors: Rabie E. Khalil, Dunlap, IL (US); Xiaodong Huang, Peoria, IL (US); John James Krone, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/094,270

(22) Filed: Mar. 31, 2005

(65) Prior Publication Data
US 2006/0218909 A1  Oct. 5, 2006

(51) Int. Cl.
*F15B 13/04* (2006.01)
*F16D 31/02* (2006.01)

(52) U.S. Cl. ............... 60/403; 60/405; 91/32

(58) Field of Classification Search ........... 60/403, 60/404, 405; 91/6, 28, 32, 427
See application file for complete search history.

(56) References Cited

U.S. PATENT DOCUMENTS

| | | | |
|---|---|---|---|
| 4,114,720 A | 9/1978 | Ericson et al. | |
| 4,131,177 A * | 12/1978 | Goodbary et al. | 60/405 |
| 4,143,583 A | 3/1979 | Bauer et al. | |
| 4,190,130 A | 2/1980 | Beck | |
| 4,197,871 A | 4/1980 | Merkel | |
| 4,953,445 A | 9/1990 | Kervagoret et al. | |
| 5,249,639 A * | 10/1993 | Marr et al. | 60/405 |
| 5,353,685 A | 10/1994 | Snow | |
| 5,489,005 A | 2/1996 | Marcott et al. | |
| 5,520,262 A | 5/1996 | Marcott | |
| 5,899,292 A | 5/1999 | Paul et al. | |
| 6,039,133 A | 3/2000 | Zulu | |
| 6,131,389 A * | 10/2000 | Sorensen | 60/405 |
| 6,336,519 B1 | 1/2002 | Bohner et al. | |
| 6,712,176 B2 * | 3/2004 | Zenker et al. | 60/403 |

OTHER PUBLICATIONS

Komatsu Shop Manual, WA500-3 Wheel Loader, Serial No. WA500-3LE—A70001 and up, (110 pp.).
Rexroth Bosch Group, presentation titled "Hydrostatic Steerings," given by Helmut Funk at Mossville, IL, dated 2003 (20 pages).

(Continued)

*Primary Examiner*—Michael Leslie
(74) *Attorney, Agent, or Firm*—Finnegan, Henderson, Farabow, Garrett & Dunner

(57) ABSTRACT

An electro-hydraulic steering control system for directing fluid to steering actuators on a work machine may include a main valve configured to control fluid flow to the steering actuators. Left and right primary steering valves may be in communication with and configured to affect the main valve to control fluid flow to the steering actuators. Left and right redundant steering valves may be in communication with and configured to affect the main valve to control fluid flow to the steering actuators. A shuttle valve may be operably disposed between one of the right primary and the right redundant steering valves and the left primary and left redundant steering valves. The shuttle valve may be operable to selectively control fluid from the one of the right primary and the right redundant steering valves and the left primary and left redundant steering valves to the main valve to control the main valve.

36 Claims, 3 Drawing Sheets

OTHER PUBLICATIONS

Eaton Hydraulics, presentation titled "Steer-By-Wire Overview," given at Mossville, IL in 2003 (11 pages).

Sauer Danfoss, presentation titled "Sauer-Danfoss Steering components and applications," given at Mossville, IL in 2000, dated Jul. 5, 2000 (44 pages).

Volvo, Service Manual L220E, Section 5 Brakes (1st ed. publication date unknown) (54 pages).

Volvo, Service Manual L220E, Section 6 Steering (1st ed. publication dated unknown) (42 pages).

Volvo, Service Manual L220E, Section 9 Hydraulic system, 9:1 Hydraulic system (1st ed. publication date unknown) (64 pages).

Volvo, Service Manual L220E, Section 9 Hydraulic system, 9:2 Hydraulic diagrams (1st ed. publication date unknown) (21 pages).

* cited by examiner

- - - - - - - - LOAD SENSING LINE
— — — — DRAIN LINE
·············· PRESSURE PICKUP

ELECTRO-HYDRAULIC STEERING CONTROL SYSTEM

TECHNICAL FIELD

The present disclosure relates generally to a steering control system and, more particularly, to an electro-hydraulic steering control system.

BACKGROUND

Earthmoving and construction work machines often employ a hydraulic steering system that controls steering functions and operation. Some conventional hydraulic steering systems incorporate a hydro-mechanical valve that regulates fluid flow to steering actuators on the work machines. A direct mechanical connection with a steering wheel opens the hydro-mechanical valve in proportion to any steering wheel rotation. Other conventional hydraulic steering systems incorporate a hand-metering unit associated with the steering wheel to regulate fluid flow to the steering actuators.

More recently, some work machines employ electro-hydraulic type steering systems. These steering systems incorporate sensors that detect the rotation or movement of a steering device, such as the steering wheel. A controller may communicate with the sensor to monitor the movement of the steering wheel. Based upon the monitored movement, the controller may generate a control signal that electronically controls a hydraulic valve to allow a responsive fluid flow to the steering actuators. Such systems are less complex, less expensive, and more compact than previous hydro-mechanical steering systems.

Because steering is an important function on a work machine, some work machines include a primary hydraulic steering system and an auxiliary or secondary hydraulic steering system. If the primary hydraulic steering system is disabled or is not operating, as might occur during a valve failure, an engine failure, a pump failure, or other failure, the auxiliary or secondary hydraulic steering system may direct fluid to provide continuous steering control to the operator. In the event that the primary steering system is not operating, the work machine may be configured to automatically switch from the primary steering system to the auxiliary or secondary steering system.

One hydraulic system having a primary and a backup steering system is disclosed in U.S. Pat. No. 6,039,133. The '133 patent discloses a steering control system employing first and second steering control valves. The first steering control valve includes a first pair of actuating chambers and the second steering control valve includes a second pair of actuating chambers. The first steering control valve is controlled by a first pair of electro-hydraulic pilot valves through the first pair of actuating chambers. The second steering control valve is controlled by a second pair of electro-hydraulic pilot valves through the second pair of actuating chambers. If the first steering control valve fails, the second steering control valve may provide pilot fluid to the second pair of actuating chambers, through mechanical pilot valves.

The system disclosed in the '133 patent may be more complex than desirable or necessary. For example, the system requires the second steering control valve to have two pairs of actuating chambers in order to provide control. Because the system is complex, it may require more maintenance than is desirable. Furthermore, because the system is complex, it may be overly expensive.

The electro-hydraulic system disclosed and described herein may overcome one or more of the problems in the prior art.

SUMMARY OF THE INVENTION

In one exemplary aspect, this disclosure is directed toward an electro-hydraulic steering control system for directing fluid to steering actuators on a work machine. The steering control system may include a main valve in fluid communication with the steering actuators and configured to control fluid flow to the steering actuators. Left and right primary steering valves may be in communication with the main valve. The left and right primary steering valves may be configured to provide fluid pressure to affect the main valve to control fluid flow to the steering actuators. Left and right redundant steering valves may be in communication with the main valve. The left and right redundant steering valves may be configured to provide fluid pressure to affect the main valve to control fluid flow to the steering actuators. A shuttle valve may be operably disposed between one of: the right primary and the right redundant steering valves; and one of the left primary and the left redundant steering valves. The shuttle valve may be operable to selectively control fluid from the one of the right primary and the right redundant steering valves and one of the left primary and the left redundant steering valves to the main valve to control the main valve.

In another exemplary aspect, this disclosure is directed toward a method of directing fluid to steering actuators on a work machine. The method may include directing fluid through a main valve to the steering actuators. The main valve may selectively control fluid flow to the steering actuators. Fluid may be selectively directed through left and right primary steering valves to the main valve. The fluid through the left and right primary steering valves may affect the main valve to control fluid flow to the steering actuators. Fluid also may be selectively directed through left and right redundant steering valves to the main valve. The fluid through the left and right redundant steering valves may affect the main valve to control fluid flow to the steering actuators. Fluid may be directed from at least one of the left and right primary steering valves through a shuttle valve operably disposed between one of: the right primary and right secondary steering valves; and the left primary and the left redundant steering valves. The fluid through the shuttle valve may affect the main valve to control fluid flow to the steering actuators.

DETAILED DESCRIPTION

Reference will now be made in detail to exemplary embodiments that are illustrated in the accompanying drawings. Wherever possible, the same reference numbers will be used throughout the drawings to refer to the same or like parts. While specific configurations and arrangements are discussed, it should be understood that this is done for illustrative purposes only.

Figure 1:
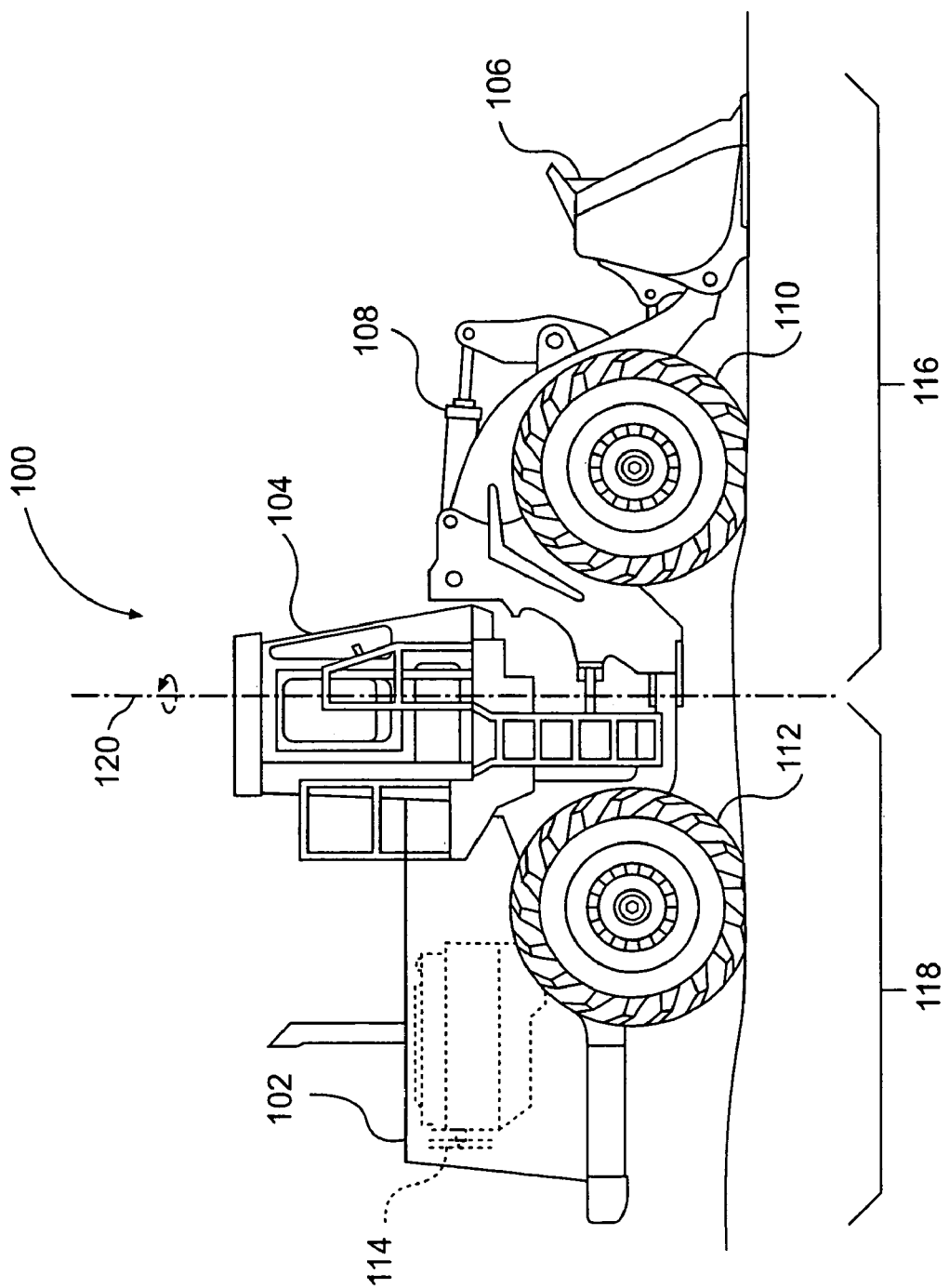
FIG. 1 is a diagrammatic illustration of an exemplary work machine.

FIG. 1 shows an exemplary work machine 100 that may incorporate an electro-hydraulic steering system as disclosed herein. The work machine 100 may include an engine housing 102, an operator station 104, and a work implement 106, such as, for example, a bucket for digging and loading material. In the example of work machine 100 being a wheel loader, the work implement 106 is powered and controlled by a number of actuators, including a tilt actuator 108.

The work machine 100 may include front and rear ground engaging devices, such as front wheels 110 and rear wheels 112 that support the work machine 100. The engine housing 102 may include a power source, such as an engine 114, that may provide power to the front and/or rear wheels 110, 112.

To drive the work machine 100, an operator may manipulate one or more steering input devices that may be housed within the operator station 104. The input devices may ultimately steer the work machine 100 by extending and retracting hydraulic steering actuators. In the example of work machine 100 being a wheel loader, the work machine 100 may include a front end 116 and a back end 118. The hydraulic steering actuators may extend between the front and back ends 116, 118 and may be configured to articulate the front end 116 relative to the back end 118 about an articulation axis 120. Although the electro-hydraulic steering system is discussed with reference to an articulating work machine, the principles and system described herein are equally applicable to a more conventional hydraulic steering system that may turn the wheels relative to the work machine body to steer the work machine.

Figure 2:
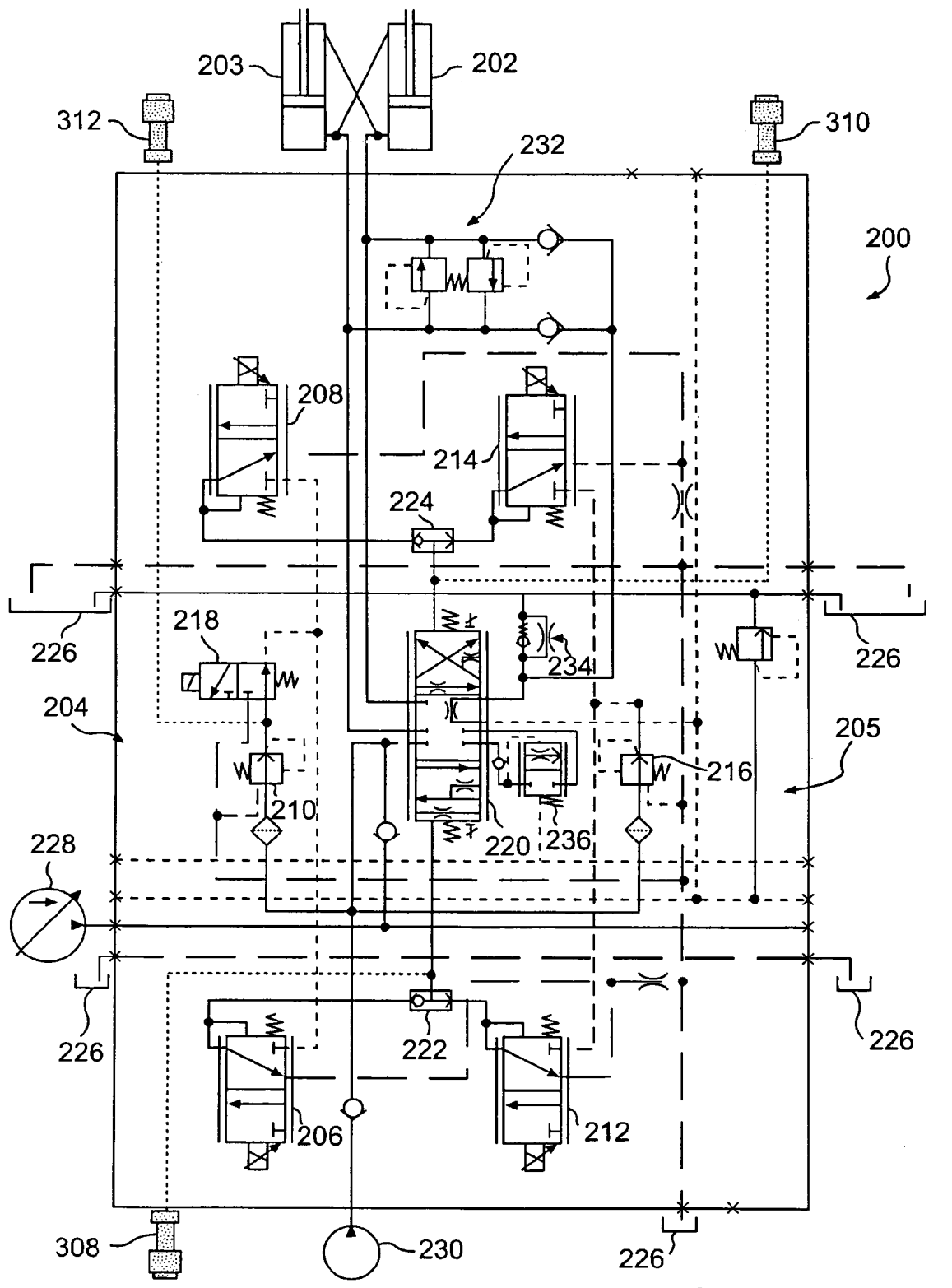
FIG. 2 is a schematic representation of an exemplary steering control system.

FIG. 2 illustrates an exemplary electro-hydraulic system 200 that may be incorporated on the work machine 100 to provide steering control. The electro-hydraulic system may include first and second steering actuators 202, 203 that provide the steering control. In the exemplary embodiment of an articulated wheel loader, the first and second steering actuators 202, 203 may extend and retract between the front and back ends 116, 118 in FIG. 1.

The electro-hydraulic system 200 also may include a plurality of fluid components and electrical components that cooperate together to control the extension and retraction of the steering actuators 202, 203, to thereby steer the work machine 100. For purposes of clarity, a description of the fluid components will be given first, followed by a description of the electrical components.

The fluid components of the electro-hydraulic system 200 may include a main spool valve 220, a primary pilot system 204, and a redundant pilot system 205. In addition, the electro-hydraulic system 200 may include an electrically actuated on-off solenoid valve 218, a right shuttle valve 222, and a left shuttle valve 224. A tank 226 holding a supply of fluid and a primary fluid source 228 and an optional secondary fluid source 230 may supply fluid to the primary and redundant pilot systems 204, 205.

The main spool valve 220 may be arranged in fluid communication with the steering actuators 202, 203 and may be configured to control the flow of fluid to effect actuation and any desired steering adjustment. In the example shown, the main spool valve 220 is a 7-way, 3-position pilot operated directional, proportional control valve operable to control the flow of pressurized fluid independently to each of the steering actuators 202, 203, or to a no-flow position that effectively blocks flow to both steering actuators 202, 203 from the primary and secondary fluid sources 228, 230. As the position of the spool within the main spool valve 220 changes, fluid is directed to the steering actuators 202, 203 at different directions and rates, thereby providing the steering control. Springs at each end of the main spool valve 220 bias the main spool valve 220 to a middle position, which may correspond to the no flow position. The main spool valve 220 may be in fluid communication with both the primary and secondary fluid sources 228, 230 and may be configured to control the flow of pressurized fluid from the sources to the steering actuators 202, 203.

The primary pilot system 204 may include a right primary steering pilot valve 206, a left primary steering pilot valve 208, and a primary pressure reducing valve 210. Similarly, the redundant pilot system 205 may include right redundant steering pilot valve 212, a left redundant steering pilot valve 214, and a redundant pressure reducing valve 216.

The right and left primary steering pilot valves 206, 208 and the right and left redundant steering pilot valves 212, 214 may be 3-way, 2-position proportional solenoid reducing valves configured to direct pilot fluid to affect the position of the main spool valve 220. Accordingly, fluid flow from the steering valves 206, 208, 212, 214 may be used to shift the main spool valve 220 between its three positions, thereby affecting the amount and direction of fluid directed to the steering actuators 202, 203, and thereby controlling the turn direction and turn rate of the work machine 100. The right and left primary and redundant steering pilot valves 206, 208, 212, 214 may be supplied with pilot fluid by either the primary fluid source 228 or the secondary fluid source 230 (if provided). The primary pressure reducing valve 210 and the redundant pressure reducing valve 216 are operable in a known manner and are configured to reduce the fluid pressure fed from the primary and secondary fluid sources 228, 230 to the respective primary and redundant steering pilot valves 206, 208, 212, 214. In one exemplary embodiment, the right and left primary steering pilot valves 206, 208 comprise the two separate valves as shown in FIG. 2. In another exemplary embodiment, the right and left primary steering pilot valves 206, 208 comprise a single valve, such as, for example, a 4-way, 3-position valve. Likewise, the right and left redundant steering pilot valves 212, 214 also may comprise two separate valves, as shown, or a single valve. Other valve configurations would be apparent to one skilled in the art.

The on-off solenoid valve 218 may be a solenoid operated valve operable to control fluid flow to the primary pilot system 204. In the exemplary embodiment shown, the on-off solenoid valve 218 is disposed between the primary pressure reducing valve 210 and the left and right primary steering pilot valves 206, 208. When the on-off solenoid valve 218 is off (not energized), fluid may be allowed to flow to the left and right primary steering pilot valves 206, 208, and when the on-off solenoid valve 218 is on (energized), fluid may not be allowed to flow to the primary steering pilot valves 206, 208. Accordingly, when the on-off solenoid valve 218 is on (energized), the primary pilot system 204 is not capable of controlling the position of the main spool valve 220 and, therefore, cannot control the steering of the work machine 100. This is caused by the fact that the primary steering pilot valves 206, 208 are connected by a return line to the tank 226 and their supply of pilot fluid is cut-off when the on-off solenoid valve 218 is energized.

The right shuttle valve 222 is an example of a control element that may be employed to selectively direct fluid flow from one of the right primary steering pilot valve 206 and the right redundant steering pilot valve 212 to the main spool valve 220 to shift the position of the main spool valve 220. Likewise, the left shuttle valve 224 is an example of a control element that may be employed to selectively direct fluid flow from one of the left primary steering pilot valve 208 and the left redundant steering pilot valve 214 to the main spool valve 220 to shift the position of the main spool valve 220. Therefore, the shuttle valves 222, 224 may be operable to selectively direct fluid from one of the primary or the redundant pilot systems 204, 205 to control the position of the main spool valve 220 and thereby control the amount and direction of fluid from the main spool valve 220 to the steering actuators 202, 203. The operation of the shuttle valves 222, 224 to prioritize the flow of pilot fluid to the main spool valve 220 is aided by draining the primary pilot system 204 pilot fluid to the tank 226 at the on-off solenoid valve 218 when the primary pilot system is deactivated.

The tank 226 may constitute a reservoir configured to hold a supply of fluid, such as, for example, a dedicated hydraulic oil, an engine lubrication oil, a transmission lubrication oil, or any other fluid known in the art. One or more hydraulic systems within the work machine 100, including the electro-hydraulic system 200, may draw fluid from and return fluid to the tank 226. It is also contemplated that the electro-hydraulic system 200 may be connected to multiple separate fluid tanks.

The primary fluid source 228 and the secondary fluid source 230 may be configured to draw fluid from the tank 226 and produce a flow of pressurized fluid to the steering pilot valves 206, 208, 212, 214, the main spool valve 220, and the steering actuators 202, 203. The primary and secondary fluid sources 228, 230 may constitute, for example, a variable displacement pump, a fixed displacement pump, a variable delivery pump, or any other pressurizing system known in the art. The primary and secondary fluid sources 228, 230 may be drivably connected to a power source, such as the engine 114 in FIG. 1, by for example, a countershaft (not shown), a belt (not shown), an electrical circuit (not shown), or in any other suitable manner. Alternately, the primary and secondary fluid sources 228, 230 may be indirectly connected to the power source via a torque converter, a gear box, or in any other appropriate manner. It is contemplated that multiple sources of pressurized fluid may be interconnected to supply pressurized fluid to electro-hydraulic system 200.

The electro-hydraulic system 200 may include additional components, including, for example, make-up and relief valves 232, one or more back pressure valves 234, and a pressure compensator valve 236. The make-up and relief valves 232 may be associated with the fluid lines between the main spool valve 220 and the steering actuators 202, 203. The make-up and relief valves 232 may provide shock relief and fluid make up in a manner known in the art. The back-pressure valve 234 may be disposed in a return line from the steering actuators 202, 203 and may be configured to maintain a level of pressure in the steering actuators 202, 203 to enhance responsiveness and increase standby pressure. The pressure compensator valve 236 may be an optional valve that may be included when the fluid pressure from the first and second fluid sources 228, 230 is used to provide fluid power to additional components on the work machine 100. The pressure compensator valve 236 may be configured to ensure that although fluid may be used to control other components, a sufficient amount of fluid is always available for the electro-hydraulic system 200. It is contemplated that the electro-hydraulic system 200 may include additional and/or different components than those shown. For example, the electro-hydraulic system 200 may include accumulators, additional restrictive orifices, check valves, pressure relief valves, makeup valves, pressure-balancing passageways, and other components known in the art. It is contemplated that other components may also be utilized in the system to customize the system according to specific needs.

Figure 3:
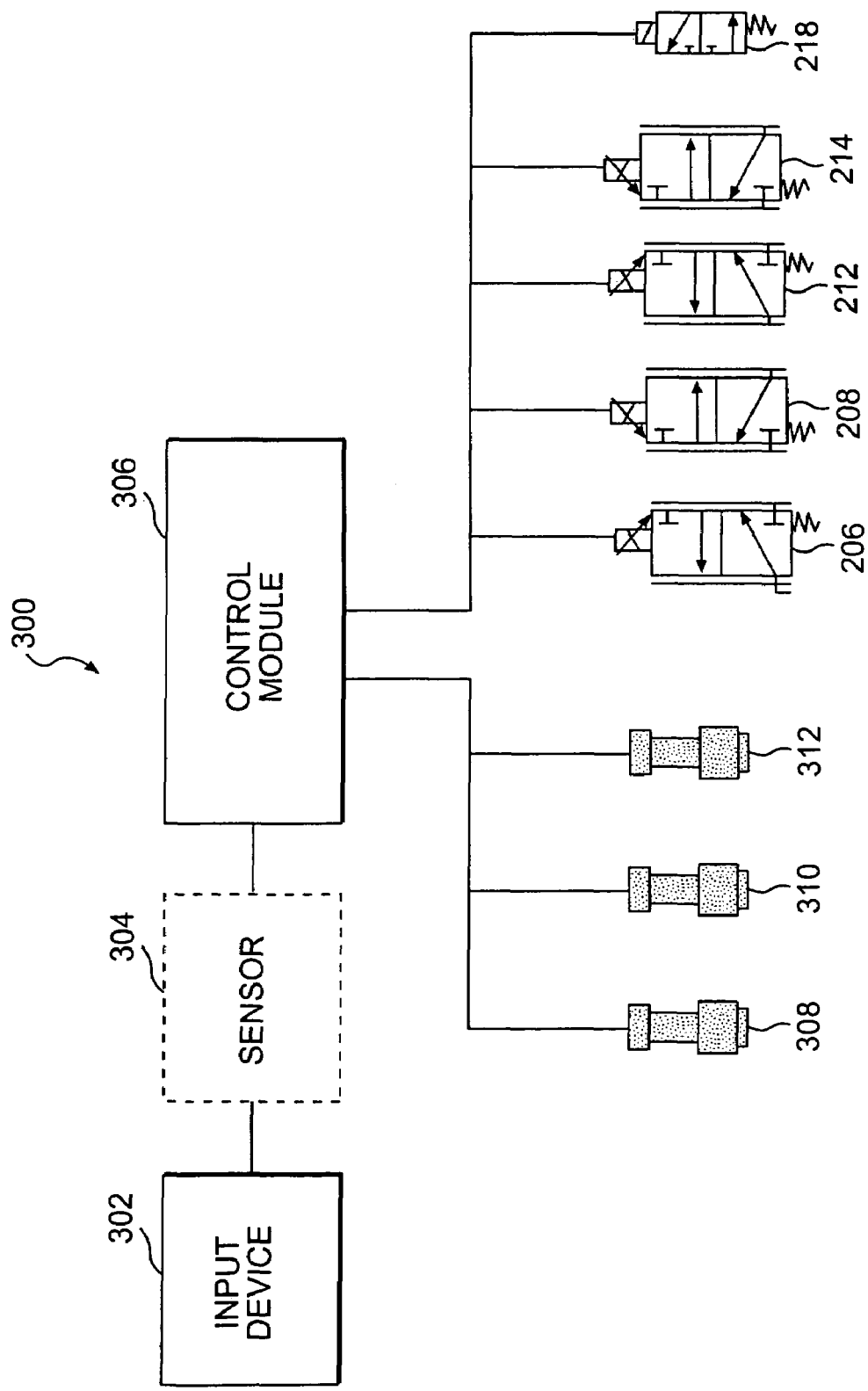
FIG. 3 is a schematic representation of an exemplary electrical control system.

The electrical components of the electro-hydraulic system 200 are shown in and discussed with reference to both FIGS. 2 and 3. FIG. 3 shows a control system 300 operable to receive data and to control the solenoid actuated valves of the electro-hydraulic system 200. The control system 300 may include an input device 302, an optional sensor 304 associated with the input device 302, a control module 306, and a series of pressure sensors 308, 310, 312.

The input device 302 could be a steering wheel, a joystick, or other input device known in the art, and may be disposed within the operator station 104 for manipulation by a work machine operator. Configured to generate a desired movement signal, the input device 302 sends any input to the control module 306 as an electrical steering signal. For example, in the exemplary embodiment where the input device 302 is a steering wheel, an operator may turn the steering wheel to generate a steering signal as a command to operate the electro-hydraulic system 200 to effect the desired turn. An optional sensor 304, such as a transducer, may be associated with the input device 302 and may be used to detect manipulation of the input device 302. Thus, the sensor 304 may generate the steering signal.

The control module 306 may include a processor and memory as known in the art. The memory may store one or more routines, which could be software programs, for controlling the electro-hydraulic system 200. For example, the control module 306 may be configured to receive information from the input device 302 or sensor 304 and the pressure sensors 308, 310, 312, and may be in operable communication with any of the solenoid actuated valves of the electro-hydraulic system 200. For example, in FIG. 3, the control module 306 may be in communication with the steering valves 206, 208, 212, 214 and the on-off solenoid valve 218. The control module 306 may be configured to generate a control signal based on the input signal from the input device 302 to provide an appropriate signal to control the valves to affect the main spool valve 220, thereby controlling the steering of the work machine 100.

The control module 306 may include in its memory pre-established acceptable ranges of pilot fluid pressures for any given steering signal received from the input device 302. The control module 306 may be configured to compare measured pilot fluid pressures to the pre-established pressure ranges to confirm that the pilot fluid pressures used to control the position of the main spool valve 220 are within the acceptable range and operating correctly. The control module 306 may be configured to switch operation of the electro-hydraulic system 200 from the primary pilot system 204 to the redundant pilot system 205 if the measured pilot fluid pressures fall outside the pre-established pressure ranges.

The pressure sensors 308, 310, 312 may be associated with the fluid lines between components or with the components themselves and may measure fluid pressures within the electro-hydraulic system 200. They may be configured to communicate the monitored pressures to the control module 306 for comparison to the pre-established pressure ranges. In this embodiment, the pressure sensors include a right pressure sensor.308, a left pressure sensor 310, and a primary fluid source pressure sensor 312. As shown in FIG. 2, the right and left pressure sensors 308, 310 are disposed between the main spool valve 220 and the respective right and left shuttle valves 222, 224. By monitoring the fluid pressure between the shuttle valves 222, 224 and the main spool valve 220, the right and left pressure sensors 308, 310 may detect the pilot force being applied by either the primary or secondary pilot systems 204, 205 to shift the main spool valve 220 to control the steering on the work machine 100. The primary fluid source pressure sensor 312 may be configured to monitor the fluid pressure being fed to the right and left primary steering pilot valves 206, 208. In the exemplary embodiment shown in FIG. 2, the primary fluid source pressure sensor 312 is disposed between the primary pressure reducing valve 210 and the on-off solenoid valve 218. The pressure sensors 308, 310, 312 may be disposed at other locations about the electro-hydraulic system 200 to provide desired data about the system's operating condition.

INDUSTRIAL APPLICABILITY

The electro-hydraulic steering system 200 described herein may be used to simplify and improve current steering systems using primary and redundant steering components. The electro-hydraulic system 200 may provide simple and reliable switching between the primary system and the redundant system, should it become necessary.

In use, the electro-hydraulic system 200 may include pressurized fluid from the primary fluid source 228. The fluid pressure may be maintained at a level that provides immediate fluid flow through the main spool valve 220 when the main spool valve 220 is moved to an open position. The primary pressure reducing valve 210 may reduce the fluid pressure to a desired level that may be used by the right and left primary steering pilot valves 206, 208. The primary fluid source pressure sensor 312 may monitor the fluid pressure after the primary pressure reducing valve 210 to detect whether the fluid pressure is sufficient to provide desired steering control. In addition, should the monitored fluid pressure be outside a designated range, the electro-hydraulic system 200 may switch control from the primary pilot system 204 to the redundant pilot system 205.

An operator may steer the work machine 100 by manipulating the input device 302. The input device 302, or a sensor 304 associated with the input device 302, may send a steering signal to the control module 306. Accordingly, the control module 306 may receive the steering signal and, in addition, a pressure signal from the primary fluid source pressure sensor 312. Based on the steering signal, the control module 306 may generate a control signal to actuate the solenoid of the relevant right or left primary steering pilot valve 206, 208. Because the steering valves 206, 208 are proportional valves, the control module 306 may open the steering valves 206, 208 only a desired amount to regulate pressure. Fluid may then be directed through the proper steering pilot valve to the associated shuttle valve. So long as the fluid pressure from the primary steering pilot valves 206, 208 is greater than pressure from the redundant steering pilot valves 212, 214, the fluid from the primary steering pilot valves 206, 208 will be used as the pilot fluid to control the position of the main spool valve 220. Accordingly, fluid from the primary steering pilot valves 206, 208 may flow through the shuttle valve to the main spool valve 220 and apply a pilot fluid force to affect the position of the main spool valve 220. The pilot pressure against the main spool valve 220 affects the position of the main spool valve 220, which directly affects the fluid that may flow through the main spool valve 220 to the steering actuators 202, 203.

The right and left pressure sensors 308, 310 may monitor the fluid pressure acting to affect the position of the main spool valve 220 and communicate a signal indicative of the pilot pressure to the control module 306. The control module 306 may include in its memory pre-established acceptable ranges of pilot fluid pressures for any given steering signal received from the input device 302. The control module 306 may be configured to compare the measured pilot fluid pressure to the pre-established pressure ranges to confirm that the pilot fluid pressure used to control the position of the main spool valve 220 is within the acceptable range.

If the fluid pressure, as detected by the right and left pressure sensors 308, 310 or the primary fluid source pressure sensor 312, is not within the pre-established ranges during operation, the control module 306 may deactivate the primary pilot system 204 and activate the redundant pilot system 205. Deactivation of the primary pilot system 204 may occur when the control module 306 sends a control signal to the on-off solenoid valve 218 to energize the solenoid of the on-off solenoid valve 218. So doing eliminates fluid flow to the right and left primary steering pilot valves 206, 208. Furthermore, fluid pressure in the line between the on-off solenoid valve 218 and the primary steering pilot valves 206, 208 may be drained to the tank through the on-off solenoid valve 218. At the same time, the redundant pilot system 205 may be operated by the control module 306 to provide continued steering and control to the work machine 100.

To provide continued steering and control, the primary fluid source 228 or secondary fluid source 230 may provide pressurized fluid through the redundant fluid pilot system 205 to the main spool valve 220 to control the steering actuators 202, 203, and in addition, may provide pressurized pilot fluid to the right and left redundant steering pilot valves 212, 214 to control the position of the main spool valve 220. To steer, in response to a signal from the input device 302, the control module 306 may open the proper right or left redundant steering pilot valve 212, 214 a proper amount to provide pilot fluid flow to control the position of the main spool valve 220. The fluid from the right or left redundant steering pilot valve 212, 214 may flow to the associated shuttle valve. Because at this time, the pressure from the redundant steering pilot valve is greater than the pressure from the primary steering pilot valve, the shuttle valve allows passage of the fluid from the redundant fluid valve, while blocking the fluid line to the primary steering pilot valve.

The shuttle valve, therefore, is an example of a control element that properly prioritizes pilot fluid from the primary and the redundant pilot systems 204, 205 to control the position of the main spool valve 220 and provide continuous steering control when the primary pilot system 204 fails. A shuttle valve does so in a simple, efficient, and reliable manner. This simple and efficient configuration may reduce the cost of the system while improving reliability.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An electro-hydraulic steering control system for directing fluid to steering actuators on a machine, comprising:
   a main valve in fluid communication with the steering actuators and configured to control fluid flow to the steering actuators;

left and right primary steering valves in communication with the main valve and configured to provide fluid pressure to affect the main valve to control fluid flow to the steering actuators;

left and right redundant steering valves in communication with the main valve and configured to provide fluid pressure to affect the main valve to control fluid flow to the steering actuators;

a shuttle valve operably disposed between one of:
   the right primary and the right redundant steering valves; and
   the left primary and the left redundant steering valves, the shuttle valve being operable to selectively control fluid from the one of the right primary and the right redundant steering valves and the left primary and the left redundant steering valves to the main valve to control the main valve.

2. The electro-hydraulic steering control system of claim 1, including a second shuttle valve operably disposed between the other of:
   the right primary and the right redundant steering valves; and
   the left primary and the left redundant steering valves, the second shuttle valve being operable to selectively control fluid from the other of the right primary and the right redundant steering valves and the left primary and the left redundant steering valves to the main valve to control the main valve.

3. The electro-hydraulic steering control system of claim 1, wherein the left and right primary steering valves and the left and right redundant steering valves are 3-way, 2-position proportional solenoid valves.

4. The electro-hydraulic steering control system of claim 1, further including an on-off solenoid valve disposed to selectively allow or block fluid flow to the left and right primary steering valves.

5. The electro-hydraulic steering control system of claim 4, wherein the on-off solenoid valve is configured to drain fluid to a tank.

6. The electro-hydraulic steering control system of claim 1, including:
   a primary fluid source; and
   a secondary fluid source, the primary and secondary fluid sources being operable to provide fluid at least to the main valve, the left and right primary steering valves, and the left and right redundant steering valves.

7. The electro-hydraulic steering control system of claim 1, including:
   a primary pressure reducing valve disposed between a fluid source and the left and right primary steering valves; and
   a redundant pressure reducing valve disposed between the fluid source and the left and right redundant steering valves.

8. The electro-hydraulic steering control system of claim 1, including a back-pressure valve in a return line from the steering actuators.

9. The electro-hydraulic steering control system of claim 1, including a pressure sensor configured to monitor pressure in a line between the shuttle valve and the main valve.

10. The electro-hydraulic steering control system of claim 1, wherein the left and right primary steering valves are separate from one another and the left and right redundant steering valves are separate from one another.

11. A method of directing fluid to steering actuators on a machine, comprising:
   selectively directing fluid through a main valve to the steering actuators, the main valve controlling fluid flow to the steering actuators;
   selectively directing fluid through left and right primary steering valves to the main valve, the fluid through the left and right primary steering valves affecting the main valve to control fluid flow to the steering actuators;
   selectively directing fluid through left and right redundant steering valves to the main valve, the fluid through the left and right redundant steering valves affecting the main valve to control fluid flow to the steering actuators; and
   directing fluid from at least one of the left and right primary steering valves through a shuttle valve operably disposed between one of:
      the right primary and the right redundant steering valves; and
      the left primary and the left redundant steering valves, the fluid through the shuttle valve affecting the main valve to control fluid flow to the steering actuators.

12. The method of claim 11, including actuating an on-off solenoid valve to selectively allow or block fluid flow to the left and right primary steering valves.

13. The method of claim 12, including draining fluid through the on-off solenoid valve to a tank.

14. The method of claim 11, further including selectively providing fluid to the main valve, the left and right primary steering valves, and the left and right redundant steering valves with a primary fluid source and a secondary fluid source.

15. The method of claim 14, including reducing fluid pressure from between the primary fluid source and the left and right primary steering valves with a primary pressure reducing valve.

16. The method of claim 11, including providing fluid pressure in the return line from the steering actuators with a back-pressure valve.

17. The method of claim 11, including monitoring pressure in a line between the shuttle valve and the main valve with a pressure sensor.

18. A machine, comprising:
   front and rear ground engaging devices;
   steering actuators configured to turn one of the front and rear ground engaging devices relative to the other of the front and rear ground engaging devices;
   a main valve in fluid communication with the steering actuators and configured to control fluid flow to the steering actuators;
   a primary pilot system including left and right primary steering pilot valves in communication with the main valve and configured to provide fluid pressure to affect the main valve to control fluid flow to the steering actuators;
   a redundant pilot system including left and right redundant steering pilot valves in communication with the main valve and configured to provide fluid pressure to affect the main valve to control fluid flow to the steering actuators; and
   a right and a left shuttle valve, the right shuttle valve being disposed between the right primary steering pilot valve and the right redundant steering pilot valve and the left shuttle valve being disposed between the left primary steering pilot valve and the left redundant steering pilot valve, the right shuttle valve being operable to selectively control fluid from the right primary steering pilot valve and the right redundant steering pilot valve to the main valve to control the main valve, and the left shuttle valve being operable to selectively control fluid from the left primary steering pilot valve and the left redundant steering pilot valve to the main valve to control the main valve.

19. The machine of claim 18, further including an on-off solenoid valve disposed to selectively allow or block fluid flow to the left and right primary steering pilot valves.

20. The machine of claim 19, wherein the on-off solenoid valve is configured to drain fluid from at least a portion of the primary pilot system during a primary pilot system failure.

21. The machine of claim 18, further including:
a primary and a secondary fluid source each operable to provide fluid to the main spool valve, the left and right primary steering pilot valves, and the left and right redundant steering pilot valves;
a primary pressure reducing valve disposed between the primary and secondary fluid sources and the left and right primary steering pilot valves; and
a redundant pressure reducing valve disposed between the primary and secondary fluid sources and the left and right redundant steering pilot valves.

22. A machine, comprising:
front and rear ground engaging devices;
steering actuators configured to turn one of the front and rear ground engaging devices relative to the other of the front and rear ground engaging devices;
a main valve in fluid communication with the steering actuators and configured to control fluid flow to the steering actuators;
a primary pilot valve in communication with the main valve and configured to provide fluid pressure to affect the main valve to control fluid flow to the steering actuators;
a redundant pilot solenoid valve in communication with the main valve and configured to provide fluid pressure to affect the main valve to control fluid flow to the steering actuators;
an on-off valve disposed to selectively allow or block fluid flow to the primary pilot valve; and
an electronic control system configured to detect a fault related to the primary pilot valve and configured to actuate the on-off valve to block fluid flow to the primary pilot valve when the fault is detected.

23. The machine of claim 22, wherein the on-off valve is a solenoid operated valve.

24. The machine of claim 22, wherein the on-off valve includes a first position and a second position, the first position being configured to permit fluid flow to the primary pilot valve, and the second position being configured to block fluid flow to the primary pilot valve and to permit fluid in the primary pilot valve to drain to a tank.

25. The machine of claim 22, wherein the redundant pilot solenoid valve is a 3-way, 2-position valve.

26. A machine, comprising:
front and rear ground engaging devices;
steering actuators configured to turn one of the front and rear ground engaging devices relative to the other of the front and rear ground engaging devices;
a main valve in fluid communication with the steering actuators and configured to control fluid flow to the steering actuators;

a fluid source operable to selectively provide pressurized fluid to the main valve;
left and right primary steering pilot valves in communication with the main valve and the fluid source and configured to provide fluid pressure to affect the main valve to control fluid flow to the steering actuators;
a primary pressure reducing valve operably disposed between the fluid source and the left and right primary steering pilot valves;
left and right redundant steering pilot valves in communication with the main valve and the fluid source and configured to provide fluid pressure to affect the main valve to control fluid flow to the steering actuators; and
a redundant pressure reducing valve operably disposed between the fluid source and the left and right redundant steering pilot valves.

27. The machine of claim 26, including:
a secondary fluid source operable to selectively provide pressurized fluid through the primary and redundant pressure reducing valves.

28. The machine of claim 26, including:
a right and a left shuttle valve, the right shuffle valve being disposed between the right primary steering pilot valve and the right redundant steering pilot valve and the left shuttle valve being disposed between the left primary steering pilot valve and the left redundant steering pilot valve,
the right shuttle valve being operable to selectively control fluid from the right primary steering pilot valve and the right redundant steering pilot valve to the main valve to control the main valve, and
the left shuttle valve being operable to selectively control fluid from the left primary steering pilot valve and the left redundant steering pilot valve to the main valve to control the main valve.

29. The machine of claim 28, including:
a right pressure sensor associated with a fluid line between the right shuttle valve and the main valve to monitor pressure in a first fluid line; and
a left pressure sensor associated with a fluid line between the left shuttle valve and the main valve to monitor pressure in a second fluid line.

30. A method of directing fluid to steering actuators on a machine, comprising:
selectively directing fluid through a main valve to the steering actuators, the main valve controlling fluid flow to the steering actuators;
selectively directing fluid through a primary steering valve or a redundant steering valve to the main valve to control the position of the main valve to control fluid flow to the steering actuators;
the fluid directed through the primary steering valve or the redundant steering valve first passing though a control element, the control element configured to allow passage of fluid therethrough to the main valve from only one of the primary steering valve or the secondary steering valve at a time.

31. The method of claim 30, including actuating an on-off solenoid valve to selectively allow or block fluid flow to the primary steering valve.

32. The method of claim 31, including draining fluid through the on-off solenoid valve to a tank.

33. The method of claim 30, further including selectively providing fluid to the main valve, the primary steering valve, and the redundant steering valve with a primary fluid source and a secondary fluid source.

34. The method of claim 33, including reducing fluid pressure from between the primary fluid source and the primary steering valve with a primary pressure reducing valve.

35. The method of claim 30, including providing fluid pressure in a return line from the steering actuators with a back-pressure valve.

36. The method of claim 30, including monitoring pressure in a line between the control element and the main valve with a pressure sensor.

* * * * *